United States Patent
Pal

(10) Patent No.: US 9,755,484 B2
(45) Date of Patent: Sep. 5, 2017

(54) METHODS AND SYSTEMS OF AIR BUBBLE FLUSHING IN LIQUID COOLED GENERATORS

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 235 days.

(21) Appl. No.: 14/570,532

(22) Filed: Dec. 15, 2014

(65) Prior Publication Data

US 2016/0172938 A1   Jun. 16, 2016

(51) Int. Cl.
   *H02K 9/19*   (2006.01)
   *H02K 1/32*   (2006.01)
   *H02K 9/26*   (2006.01)

(52) U.S. Cl.
   CPC .............. *H02K 9/19* (2013.01); *H02K 1/32* (2013.01); *H02K 9/26* (2013.01); *H02K 2213/03* (2013.01)

(58) Field of Classification Search
   CPC  H02K 9/02; H02K 9/19; H02K 15/02; H02K 1/22; H02K 1/32
   USPC .......................... 310/54, 52, 58, 59, 156, 61
   See application file for complete search history.

(56) References Cited

U.S. PATENT DOCUMENTS

| 4,496,862 | A | 1/1985 | Weber | |
|---|---|---|---|---|
| 9,103,376 | B2* | 8/2015 | Krause | F16C 37/007 |
| 2008/0115527 | A1* | 5/2008 | Doty | F04D 25/0606 62/498 |
| 2008/0168796 | A1* | 7/2008 | Masoudipour | H02K 9/19 62/505 |
| 2010/0237725 | A1* | 9/2010 | Tatematsu | H02K 1/32 310/61 |
| 2012/0013206 | A1* | 1/2012 | Meyer | H02K 1/32 310/54 |
| 2012/0085548 | A1* | 4/2012 | Fleckenstein | E21B 34/063 166/373 |

(Continued)

FOREIGN PATENT DOCUMENTS

| EP | 2369723 | 11/2015 |
|---|---|---|
| WO | 8500703 | 2/1985 |

OTHER PUBLICATIONS

International Search Report, International Application No./Patent No. 15200203.6-1504, dated May 19, 2016, European Patent Office; International Search Report 6 pages.

*Primary Examiner* — Terrance Kenerly
(74) *Attorney, Agent, or Firm* — Cantor Colburn LLP

(57) ABSTRACT

A liquid cooled generator is provided having a rotor having a central core and a main stator winding wrapped around the central core. A first laminate at a first end of the central core is provided having a first orifice defining a first diameter and a second laminate at a second end of the central core is provided having a second orifice defining a second diameter that is the same as the first diameter. A flow line passes through the central core and is configured to extend from the first laminate to the second laminate, the flow line defining a third diameter that is larger than the first and second diameters. The first and second diameters are configured such that air flow is permitted to pass through the first and second laminates and to restrict the flow of a liquid through the first and second laminates.

16 Claims, 4 Drawing Sheets

(56) References Cited

U.S. PATENT DOCUMENTS

2013/0241326 A1* 9/2013 Pal .......................... H02K 1/32
310/54
2013/0285439 A1* 10/2013 Akita ................... B62D 55/092
305/124

* cited by examiner

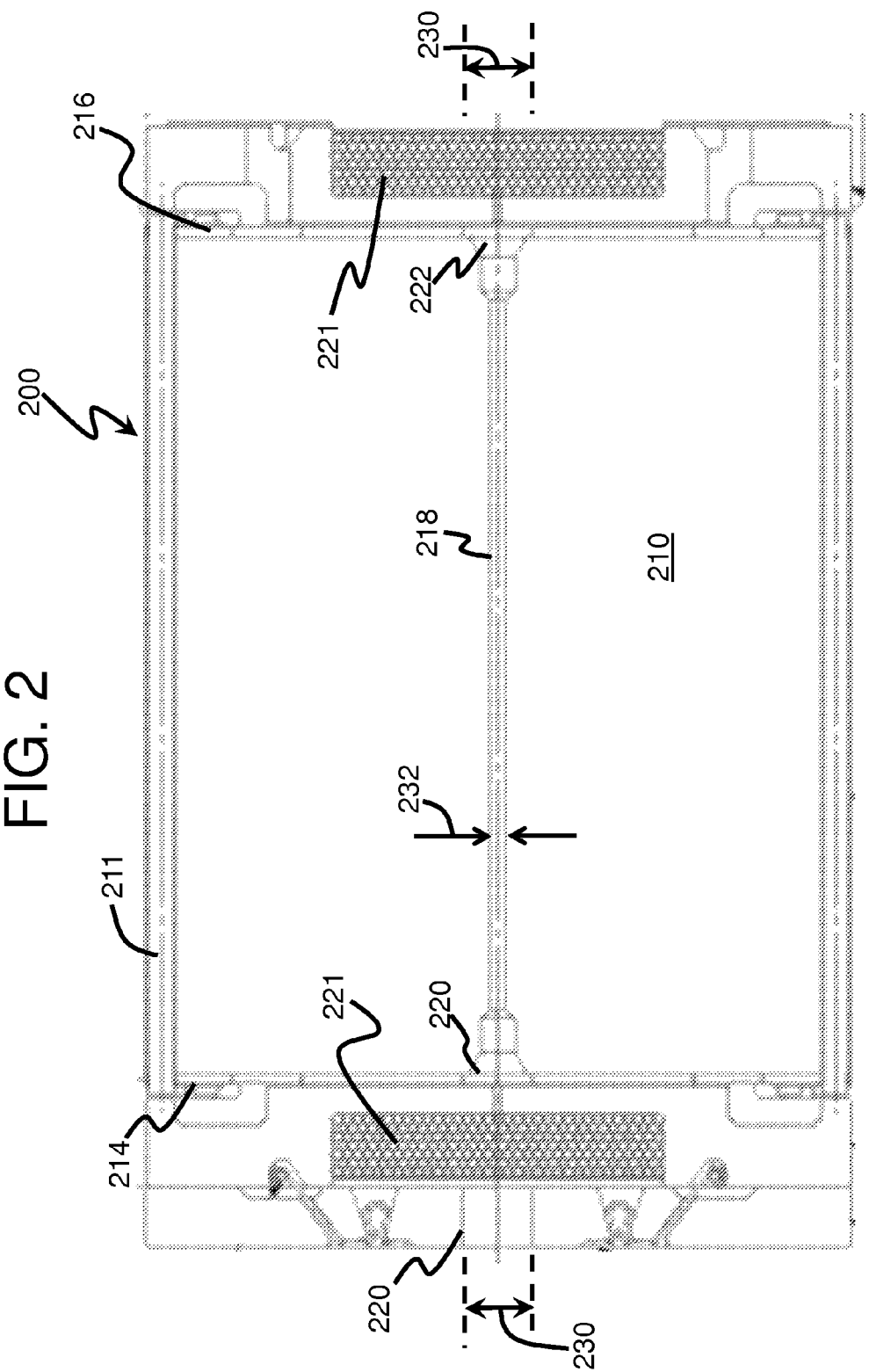

US 9,755,484 B2

METHODS AND SYSTEMS OF AIR BUBBLE FLUSHING IN LIQUID COOLED GENERATORS

BACKGROUND OF THE INVENTION

The embodiments herein generally relate to liquid cooled generators and more specifically to improved methods and systems of air bubble flushing in liquid cooled generators.

Liquid cooled generators, such as two-pole generators, may be used in aircraft applications. Such generators employ a cooling flow of fluid through spaces between conductors in a main field winding to prevent overheating and damage to the main field winding. When first installed, or during various maintenance operations, the generators may have air or other gas within or throughout the flow paths designed for the cooling fluid. When the cooling fluid is then pumped into the generator air bubbles may be trapped in various sections of the generators, particularly around the main winding. Such air bubbles may enable overheating and damage to the generator during operation.

As such, flushing of the generator cooling system is performed to remove air from the cooling fluid flow path, and to prevent the air bubbles from remaining in the generator. In order to flush air bubbles from the inlet and exit end turns of the main winding bundle, a cooling tube (bubble flushing tube) may be formed in the axis of the core lamination that forms the core of the winding. During filling with cooling fluid, such as oil, and/or during operation, air bubbles will flow through the bubble flushing tube and exit the generator through a radial shaft orifice downstream of the main winding. In order to flush the air bubbles, such systems divert some of the cooling fluid from the main winding portion and through the central core in order to remove the bubbles from the system.

BRIEF DESCRIPTION OF THE INVENTION

According to one embodiment, a liquid cooled generator is provided having a rotor having a central core and a main stator winding wrapped around the central core. A first laminate at a first end of the central core is provided having a first orifice defining a first diameter and a second laminate at a second end of the central core is provided having a second orifice defining a second diameter that is the same as the first diameter. A flow line passes through the central core and is configured to extend from the first laminate to the second laminate, the flow line defining a third diameter that is larger than the first and second diameters. The first and second diameters are configured such that air flow is permitted to pass through the first and second laminates and to restrict the flow of a liquid through the first and second laminates.

According to another embodiment, a method of manufacturing a liquid cooled generator is provided. The method includes forming a rotor having a central core and a main stator winding wrapped around the central core, forming a first laminate at a first end of the central core the first laminate having a first orifice defining a first diameter, forming a second laminate at a second end of the central core the second laminate having a second orifice defining a second diameter that is the same as the first diameter, and forming a flow line passing through the central core and configured to extend from the first laminate to the second laminate, the flow line defining a third diameter that is larger than the first and second diameters. The first diameter and the second diameter are configured such that air flow is permitted to pass through the orifices of the first and second laminates and to restrict the flow of a liquid through the orifices of the first and second laminates.

Technical effects of embodiments of the invention include providing an efficient bubble flushing system that maintains high fluid flow through a main winding of a rotor. Further technical effects of embodiments of the invention include providing a liquid cooled generator with reduced diameter flow path ports, and thus fluid flow through a central core of a rotor may be restricted and/or reduced, and fluid flow through the windings of the rotor may be increased and/or maximized.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 2 is a detailed schematic illustration of a two-pole machine used in a liquid cooled generator;

DETAILED DESCRIPTION OF THE INVENTION

Figure 1A:
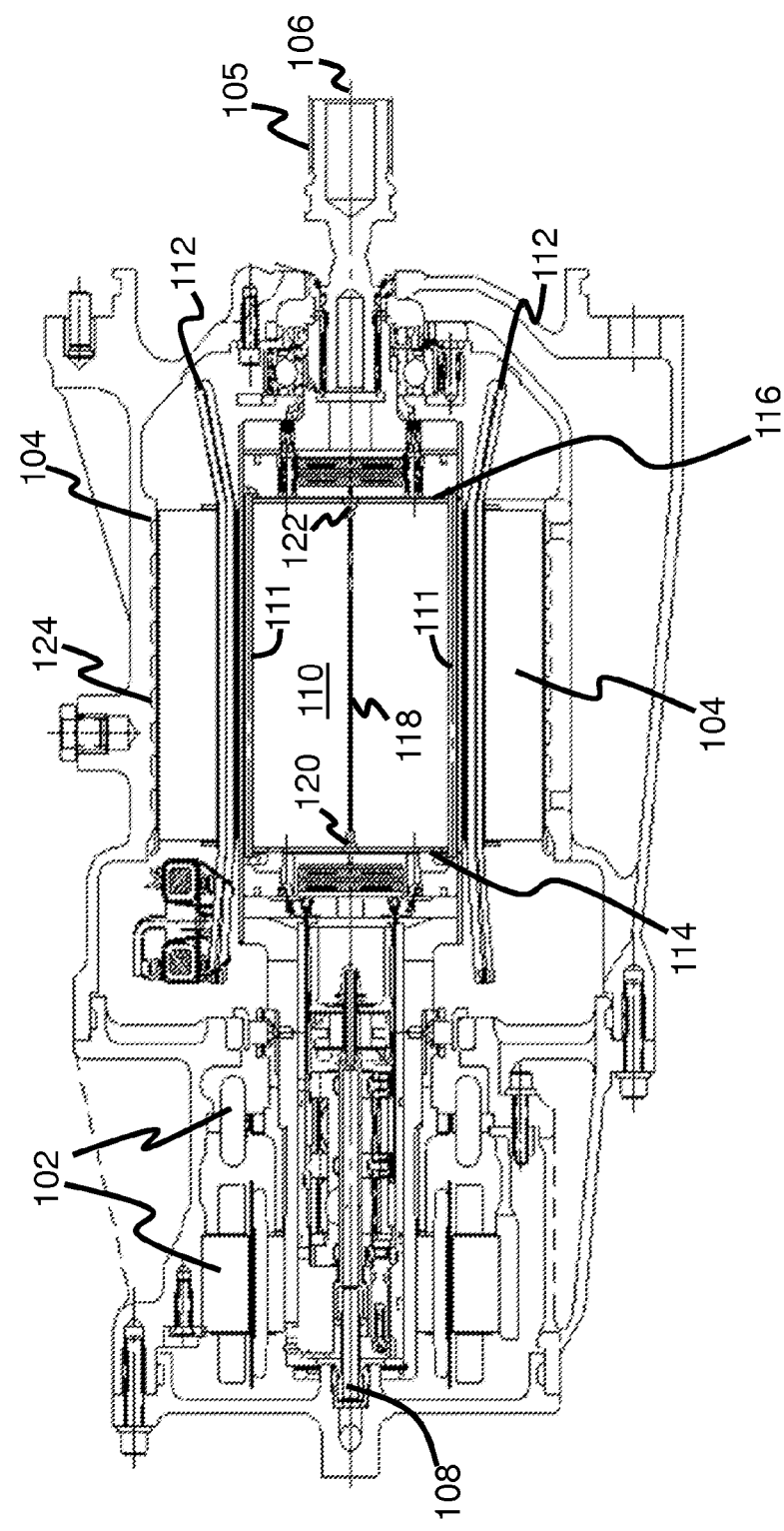
FIG. 1A is a schematic illustration of a generator employing a liquid cooled system.

Referring to the drawings, FIG. 1A illustrates a schematic of a generator employing a liquid cooling system. Generator 100 includes front rotors 102 and a back rotor 104, which have associated stators. Front rotors 102 may be configured as PMG and exciter rotors and back rotor 104 may be configured as a main rotor. Rotation of the generator 100 is about a rotating spline or shaft 105 defining a central axis 106. The rotating spline 105 includes a central fluid line 108 which may be configured as a hollow shaft in the rotating spline 105. The rotating spline 105 is operationally connected to an engine gear box that is operationally connected to an engine. In an aircraft, the engine may be an engine of the aircraft or may be an auxiliary power unit.

Back rotor 104 includes a main rotor core 110, which has an outer edge or diameter 111 formed of a rotor winding. A main coil or stator winding 112 is wrapped around the cylinder of the main rotor core 110 and forms the stator. The stator winding 112 and outer diameter 111 of rotor 104 are movably held together. At a first end is a first end lamination 114 and at a second end is a second end lamination 116 which are parts of the main rotor winding assembly. Thus, the back rotor 104 is configured to rotate within the main stator winding 112, such as by rotation of the rotating spline 105. The main stator winding 112 is wound around a stator core.

A flow line 118 is configured to pass through the center of the main rotor core 110, and is part of the central flow path 108. The flow line 118 is configured to enable bubbles and air to pass through the generator 100 and specifically to permit removal of the air and prevent air pockets or bubbles from lodging or forming within the winding of outer diameter 111. At a first end of the flow line 118, and located within the first lamination, is a first port or orifice 120 that provides fluid an entry point into the flow line 118. At a second end of the flow line 118, and located within the second lamination, is a second port or orifice 122 that provides fluid an exit point out of the flow line 118. Back rotor 104 and stator winding 112 also include back iron cooling grooves 124 that are configured to provide cooling at the exterior side of main winding 112, and the cooling grooves 124 are configured in parallel or series to the rotor winding of cylinder/rotor 111. Main winding 112 may be additionally cooled by spray cooling.

Figure 1B:
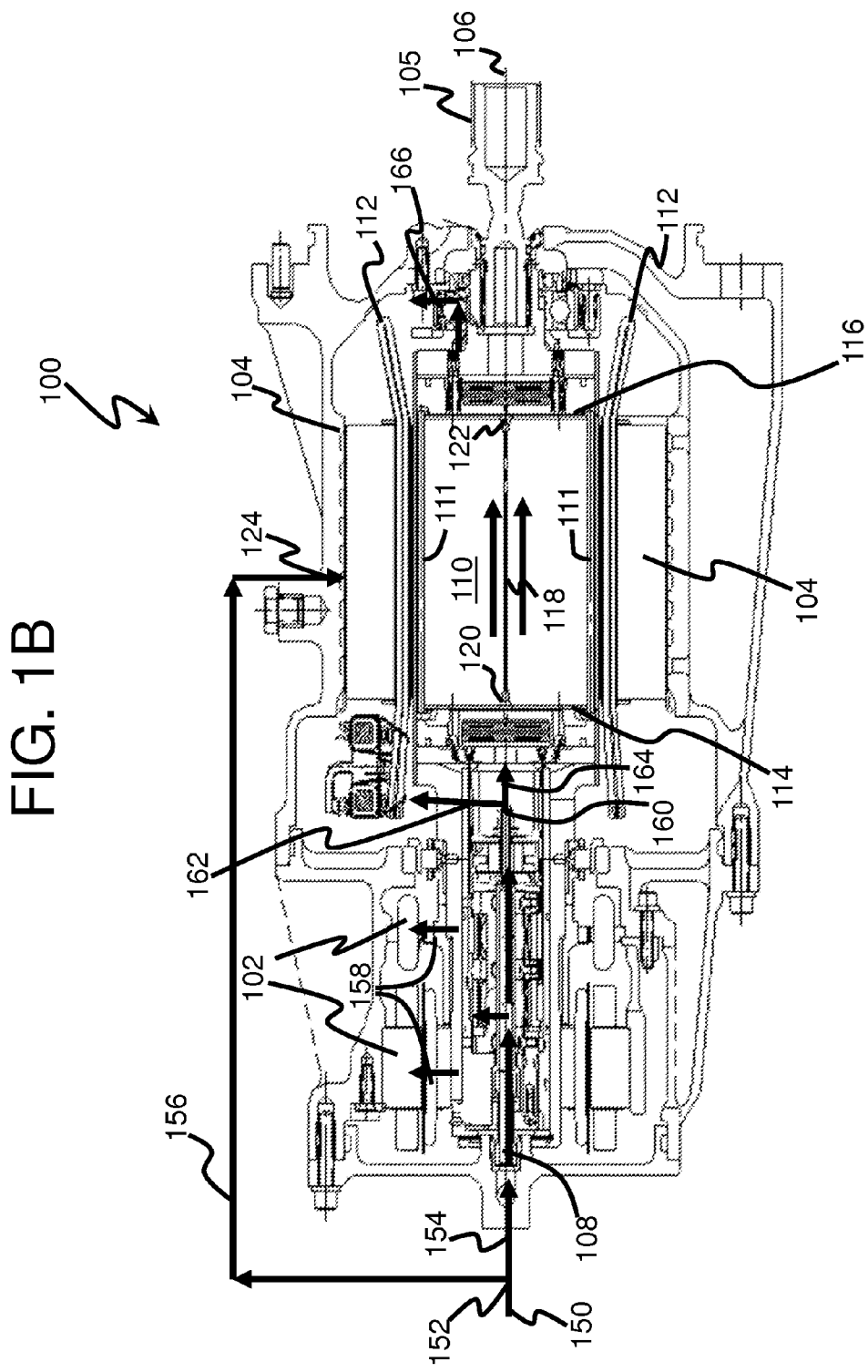
FIG. 1B shows the cooling fluid flow path through the generator shown in FIG. 1A.

Referring now to FIG. 1B, the cooling flow configuration within generator 100 is shown. Fluid passes through the central fluid line 108 of the rotating shaft 105 to provide cooling fluid, such as oil, to cool the generator 100 and provide the cooling fluid to the rotors 102, 104, from a left to right direction in FIG. 1B. Fluid is configured to be diverted from the central fluid line 108 radially and to flow through an end turn of the main winding 112 of the back rotor 104. The flowing fluid will then exit the generator 100 to be recycled for continuous cooling.

Fluid flow enters the generator 100 at a first end 150 of central flow path 108 and extends along central axis 106 of rotating spline 105. The fluid flow is split at a first junction 152, with a first portion 154 of the fluid flow continuing along central flow path 108, and a second portion 156 is configured to flow around the generator 100 and reenter the generator 100 at the back iron cooling grooves 124 to provide cooling fluid thereto.

Continuing along the flow path 108, after junction 152, the fluid flows along fluid path 154 and into the generator 100. Fluid flows out of the central flow path 108 to the rotors 102 and to other elements of the generator 100, as shown at 158. The fluid flow is distributed and spread to the front rotors 102 through centrifugal force out of central flow path 108 and to the various components. The fluid flow continues along the central flow path 108 toward the rear rotor 104. At junction 160, the fluid path is split into multiple fluid paths, for example three paths. A first portion 162 of the fluid is conveyed radially by the rotation of rotating spline 105 and the centrifugal force caused by the rotation, such that the cooling fluid may pass through the end turn of the main winding 112. After cooling the main winding 112, the fluid of first portion 162 may flow radially outward, impinge on a housing of the stator, and fall by gravity into a sump, or be collected/recollected in another manner.

A second portion 164 of the fluid flow will pass through the main rotor core 110 by entering first port 120, flowing through flow line 118, and exiting the main rotor core 110 at second port 122. Further, a portion of the fluid of second portion 164 is conveyed through the rotor windings, such that the fluid flows through and between the spaces between the wires of the windings. The various components of fluid of the second portion 164 of the fluid flow will then rejoin and exit the generator 100 at exit 166. The fluid may be configured to be recycled to provide continuous cooling to the generator 100, although other configurations are possible without departing from the scope of the invention.

When the generator 100 does not include a cooling fluid therein, it may be filled with air, i.e., substantially empty. As the fluid is passed into the generator 100, the fluid will push the air out of the generator 100, thus flushing the system of air. The flow line 118 through the main rotor core 110 allows for gas, such as air, to be expelled from the system and prevent air from being captured within the main winding 112 and/or the rotor winding of outer diameter 111. When a cooling fluid, such as a liquid (e.g., oil), is used to flush the air out of the system, this is called flushing the system or bubble flushing. It is noted that the end turns of the main winding 112 may be cooled by spray cooling, which will allow for liquid and gas at the end turns, and gas is removed from the main field winding flow path. FIG. 2 shows an example of the configuration the main field winding ends 221 in an end-on view of a rotor 200.

As a non-limiting example of the fluid flow through the generator 100, fluid may enter the generator 100 at first end 150 at a rate of about 4.40 gallons per minute ("GPM"). At junction 152, a first portion 154 may enter and pass through flow path 108 at a rate of about 3.0 GPM, and a second portion 156 may be diverted to the back iron cooling grooves 124 at a rate of about 1.45 GPM. Flowing along flow path 108, parts or portions of the first portion 154 maybe diverted to the various front rotors 102 at rates of about 0.175 GPM, 0.76 GPM, and 0.19 GPM. Then, when reaching the rear rotor 104 and main field winding 111, the fluid may flow at a rate of about 0.53 GPM to the main winding 112. Further, a rate of 1.82 GPM may flow to cool the rear rotor 104 with a portion of the flow rate passing through the windings of the rear rotor 104 and a portion of the flow rate passing through the flow line 118 through the center of the rear rotor 104, e.g., 0.5 GPM through the flow line 118 and 1.0 GPM through the windings. Fluid may exit at 166 at a rate of about 0.53 GPM. As is apparent from the above, a large amount of fluid, i.e., a high flow rate, passes through the flow line 118, which reduces the amount and rate of fluid that is conveyed to the main winding 112 and the rotor winding of outer diameter 111. This may reduce the cooling efficiency of the system because a low flow rate will result in slower or less cooling of the main winding 112 and the rotor winding of outer diameter 111. However, the flow line 118 is required to remove bubbles, and thus a trade-off in efficiency is made in order to remove air bubbles from the system. The above values and rates are merely provided for exemplary and explanatory purposes only and those of skill in the art will appreciate that other flow rates may exist during operation of the generator 100 without departing from the scope of the invention.

Turning now to FIG. 2, an illustrative schematic of a rotor 200 is shown. Rotor 200 may be substantially similar to the rear rotor 104 of FIG. 1 and thus similar features are preceded with a "2" rather than a "1." Rotor 200 includes a cylinder or outer diameter 211 that forms a hollow main rotor core 210 therein with a main stator winding wrapped around the outer diameter 211, as described above. At a first end a first end laminate 214 encloses the main rotor core 210 and at a second end a second end laminate 216 encloses the main rotor core 210. Passing through the center of the main rotor core 210 and connected to first and second laminates 214, 216 is a flow line 218, such as described above, that enables bubble flushing through the system. Fluid enters flow line 218 at a first port 220 and exits the flow line 218 at a second port 222. Further, as shown in FIG. 1B, fluid will flow parallel to the flow line 218 through the spaces between the main field winding conductors of the rotor 200, and thus cool the rotor winding.

As discussed above, a large portion or, in some cases, a majority, of the fluid flow through the rotor passes through the central flow line and is diverted away from the main winding. That is, in FIG. 2, a large portion of the fluid or a high rate of fluid flow will pass through flow line 218 to provide the bubble flushing, whereas only a relatively small portion or low rate of fluid flow will be provided to the main winding of the rotor 200 to provide cooling thereto.

The high flow rate through the flow line 218 is a result of, in part, the size or diameter of the first port 220 and the second port 222, which allow for an efficient bubble flushing. As shown, both first port 220 and second port 222 have a diameter 230, which may be about 0.1 inch (0.254 cm) in diameter or larger, and the flow line 218 may have a diameter 232 of about 0.1 inch (0.254 cm). Thus, the first port 220 and the second port 222 may have diameters that are about the same diameter or larger than the diameter of the flow line 218. This enables a high flow rate through the main rotor core 210 within flow line 218 and an efficient bubble flushing is provided.

Figure 3:
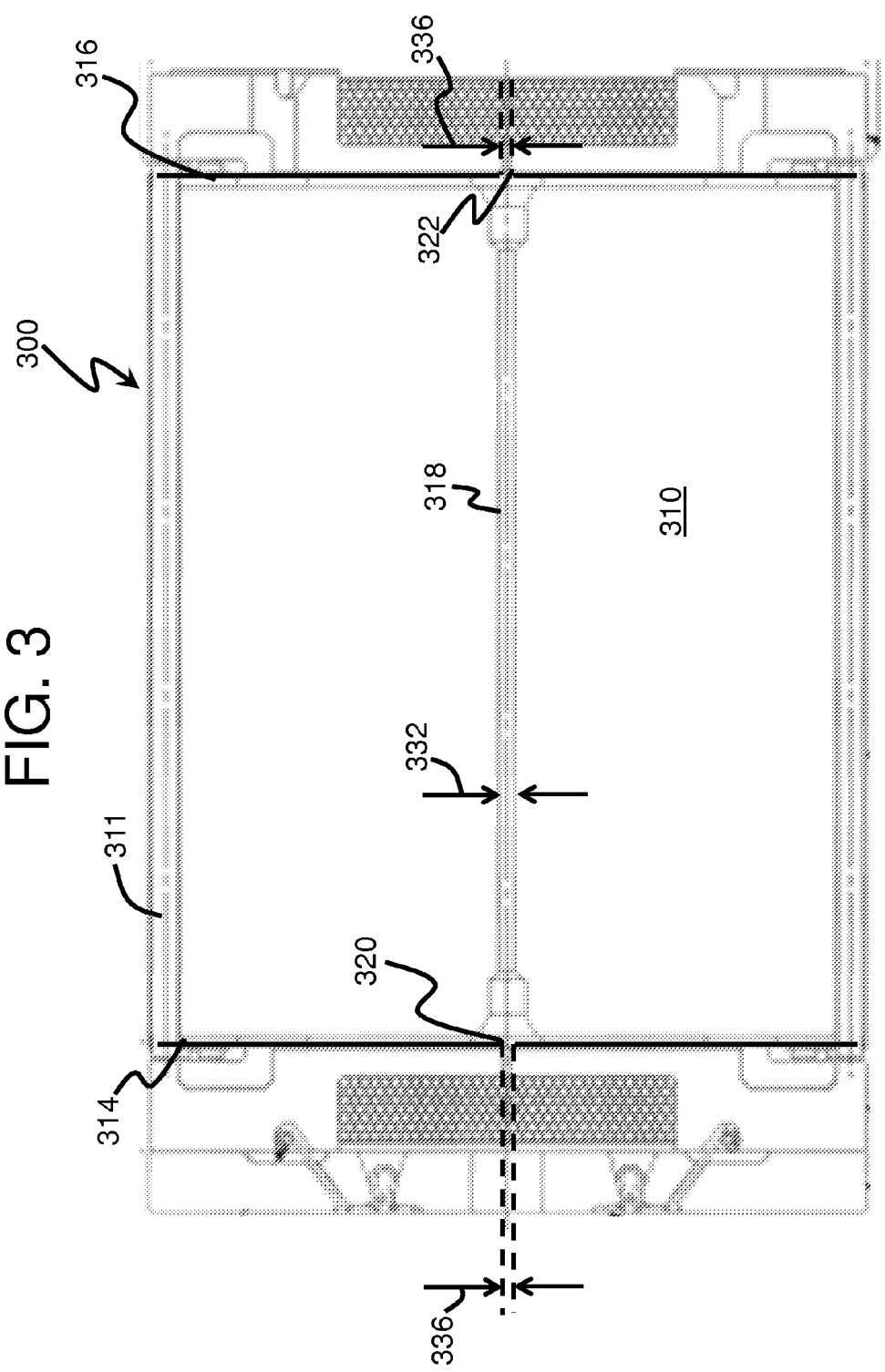
FIG. 3 is a schematic illustration of a two-pole machine used in a generator in accordance with an exemplary embodiment of the invention.

Turning now to FIG. 3, a schematic illustration of a rotor 300 accordingly to an exemplary embodiment of the invention is shown. Rotor 300 may be substantially similar to rotor 200 of FIG. 2, and thus similar features have a "3"preceding the element number rather than a "2." The primary difference between rotor 300 and rotor 200 is the construction of the first end laminate 314 and the end second laminate 316. The first end laminate 314 and the second end laminate 316 have a reduced port diameter 336 at the first port 320 and the second port 322, respectively. Reduced port diameter 336 may be configured to be smaller or significantly smaller than the diameter of the flow line 318.

As noted, the reduced port diameter 336 is smaller or significantly smaller than the diameter 332 of flow line 318. In some embodiments, the reduced port diameter 336 is sized such that air bubble flow is permitted to flow therethrough during filling and operation of a generator that houses or contains rotor 300. In contrast to the port diameter 230 (shown in FIG. 2), the reduced diameter 336 of ports 320, 322 causes substantial flow resistance to reduce the flow rate of a cooling fluid through the flow line 318. In this manner, the availability of flow of the cooling fluid for cooling the main winding of the rotor 300 may be increased in comparison to the configuration shown in FIG. 2.

For example, in some embodiments, the flow line 318 may be configured as described above, i.e., 0.1 inch (0.254 cm) in diameter, but rather than have commensurate diameter ports 320, 322, the reduced diameter 336 of ports 320, 322 may be about 0.02-0.03 inches (about 0.05-0.08 cm) in diameter. This is merely an example and those of skill in the art will appreciate that the reduced diameter 336 is to be smaller than the diameter 332 of the flow line 318, and in some embodiments the reduced diameter 336 may be substantially smaller than the diameter 332, which may be on the order of about 10% to about 30% the size of the diameter 332, although any percentage smaller is contemplated and those skilled in the art will appreciate that the diameter may be adjusted for the optimal efficiency of the system without departing from the scope of the invention.

Because there is a port at each end (port 320, port 322) of the flow line 318, the ports at/in the end laminations (314, 316) form two ports or orifices in series in the flow path (see 108) through the main rotor core 310 (e.g., flow line 318). As described, the smaller orifices or ports 320, 322 reduce the flow of cooling fluid through the flow line 318 during operation, but are sufficiently sized to permit bubble or air flow through the flow line 318 during the bubble flushing operation. Accordingly, more cooling fluid flow may be directed to flow through the main winding of the rotor 300 during operation with only a relatively small portion passing through the flow line 318.

In order to construct a rotor/stator and generator in accordance with embodiments of the invention, various methods and procedures may be employed without departing from the scope of the invention. In some embodiments, the end laminations 314, 316 are formed with the small port diameter 336 directly into the structure of the end lamination 314, 316. For example, the ports 320, 322 with the small diameter 336 may be drilled, machined, punched, etc. to form integral ports through the end laminates in accordance with embodiments of the invention. In other embodiments, the end laminates may be molded, additive manufactured, etc., such that the end laminates 314, 316 have an appropriately sized fluid port 320, 322 integrally formed therein during the manufacturing of the end laminates. Accordingly, in such embodiments, the laminates 314, 316 may act as orifice or port plates with the orifice or port formed therein. In some embodiments, depending on the design and process of forming the reduced diameter ports, the ports may have sharp edges, which may provide additional resistance and/or restrictive flow of fluid through the central core fluid line. In other embodiments, the edge of the orifice or port may not be sharp edged, and in some embodiments the edge may be tapered, curved, or have other configurations and/or geometries and/or shapes such that the efficiency of the system is improved, i.e., the port(s) is configured such that the air flow is permitted through the flow line 318, but a substantial portion and/or amount of the fluid flow is directed to pass through the main winding of the rotor 300.

In some embodiments of the invention, the ports may be manufactured in a separate plate or similar configuration that may attach to the end laminations 314, 316 of the rotor 300. In some such embodiments the separate plates may be permanently attached and/or affixed to the end laminations, and in other such embodiments, the separate plates may be removably attached to the end laminations. In either case, the separate plates may be attached by any known means, without departing from the scope of the invention.

In another embodiment, the ports, plates, and/or end laminates and/or portions thereof may be formed from a shape memory material. The shape memory material may be configured to have a thermal expansion property, for example, an effective negative expansion coefficient. That is, the material that forms the port(s) may be configured to expand in size, thus reducing the diameter of the fluid flow therethrough as a temperature in contact with the material increases. In such an example, during operation when the generator heats up, the orifice diameter in the port is reduced, resulting in a reduced and/or restricted flow through the orifice of the port. As such, in some such embodiments, the ports 320, 322 may be configured to have a larger diameter at relatively cool temperatures, such as when the stator/rotor is not in operation. This enables a high rate of flow through the flow line 318, and can enable a quick, fast, and efficient means of flushing air bubbles from the system. Then, as the stator/rotor heats up during operation, the ports 320, 322 may shrink in size and have a reduced diameter 336 that will inhibit flow through the flow line 318, thus diverting more cooling fluid flow to the main winding of the rotor 300.

In another embodiment, the ports may be configured as an insert or other type of plug with an orifice extending therethrough to permit fluid to pass through the orifice. For example, if the diameter of the flow line (such as flow line 118) is about 0.1 inches in diameter, a plug having an orifice with a diameter of about 0.02 inches may be inserted into the flow line, thus restricting cooling fluid flow therethrough, but permitting air to be flushed from the generator, as described above.

Advantageously, embodiments of the invention provide systems and techniques for maximizing cooling fluid flow through a main winding of a rotor in a liquid cooled generator. Advantageously, in some embodiments of the invention, bubble flushing of air bubbles through a generator is provided in an efficient manner, while improved cooling of the main winding of the rotor is maintained.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, the materials and manufacturing processes used to form the end laminations and/or separate sheets in accordance with embodiments of the invention may be determined based on the needs and application of the configurations, and thus the materials or manufacturing processes are not limiting. Further, although described with respect to an aircraft engine and generator, those of skill in the art will appreciate that embodiments of the invention may be employed in various types and configurations of generators that employ liquid cooling. Moreover, those of skill in the art will appreciate that although the "empty" fluid has been described as air, and the cooling fluid has been described as oil, these are merely provided for exemplary purposes, and the fluids may vary depending on the application. Further, the fluids may be any gases or liquids, as may be appropriate for a specific application, without departing from the scope of the invention. Moreover, the fluids may not necessarily be used for cooling purposes, as described herein, but rather may serve other purposes, and the flushing achieved by the invention described herein is not limited based on the type of operation of the fluids used therein.

Accordingly, the invention is not to be seen as limited by the foregoing description, but is only limited by the scope of the appended claims.

What is claimed is:

1. A liquid cooled generator comprising:
    a rotor having a central core and a main stator winding wrapped around the central core, the central core defining a central axis;
    a first laminate at a first end of the central core and having a first orifice defining a first diameter wherein the central axis passes through the first orifice;
    a second laminate at a second end of the central core and having a second orifice defining a second diameter that is the same as the first diameter wherein the central axis passes through the second orifice; and
    a flow line passing through the central core and configured to extend from the first laminate to the second laminate along the central axis, the flow line defining a third diameter that is larger than the first and second diameters,
    wherein the first diameter and the second diameter are configured such that air flow is permitted to pass through the first and second laminates and to restrict the flow of a liquid through the first and second laminates.

2. The liquid cooled generator of claim 1, wherein the first and second diameters are about 10% to 30% the size of the third diameter.

3. The liquid cooled generator of claim 1, further comprising an orifice plate attached to each of the first laminate and the second laminate, wherein the orifice plate is configured to provide the first and second diameters of the first and second laminates, respectively.

4. The liquid cooled generator of claim 1, further comprising a central spline aligned along the central axis and configured to rotate thereabout.

5. The liquid cooled generator of claim 1, further comprising a plug having an orifice therethrough and attached to each of the first laminate and the second laminate to provide the first and second diameters of the first and second laminates, respectively.

6. The liquid cooled generator of claim 1, wherein the liquid cooled generator is part of an aircraft generator.

7. The liquid cooled generator of claim 1, wherein at least one of the first laminate and the second laminate is formed from a shape memory material.

8. A method of manufacturing a liquid cooled generator, comprising:
    forming a rotor having a central core defining a central axis a main stator winding wrapped around the central core;
    forming a first laminate at a first end of the central core and having a first orifice defining a first diameter wherein the central axis passes through the first orifice;
    forming a second laminate at a second end of the central core and having a second orifice defining a second diameter that is the same as the first diameter wherein the central axis passes through the second orifice; and
    forming a flow line along the central axis and passing through the central core and configured to extend from the first laminate to the second laminate, the flow line defining a third diameter that is larger than the first and second diameters,
    wherein the first diameter and the second diameter are configured such that air flow is permitted to pass through the orifices of the first and second laminates and to restrict the flow of a liquid through the orifices of the first and second laminates.

9. The method of claim 8, wherein the step of forming at least one of the first orifice and the second orifice comprises at least one drilling, machining, and punching the orifice in the respective laminate.

10. The method of claim 8, wherein the step of forming at least one of the first laminate and the second laminate comprises at least one of molding and additive manufacturing the respective laminate with the respective orifice formed therein.

11. The method of claim 8, wherein the first and second diameter are about 10% to 30% the size of the third diameter.

12. The method of claim 8, further comprising installing an orifice plate to each of the first laminate and the second laminate, wherein the orifice plate is configured to provide the first and second diameters of the first and second laminates, respectively.

13. The method of claim 8, further comprising installing the rotor about a central spline, wherein the central spline configured to rotate and define a central axis with the rotor aligned about the central axis.

14. The method of claim 8, further comprising installing a plug having an orifice therethrough in to each of the first laminate and the second laminate to provide the first and second diameters of the first and second laminates, respectively.

15. The method of claim 8, further comprising installing the rotor into a liquid cooled generator of an aircraft.

16. The method of claim 8, wherein at least one of the first laminate and the second laminate is formed from a shape memory material.

\* \* \* \* \*